United States Patent
Nielsen et al.

(10) Patent No.: US 7,551,928 B2
(45) Date of Patent: Jun. 23, 2009

(54) LOCATION DEPENDENT CONTROL OF A MOBILE CELLULAR TELEPHONE

(75) Inventors: Peter Dam Nielsen, Kgs Lyngby (DK); Christian Kraft, Hvidovre (DK); Alexander Piorecki, Copenhagen S. (DK); Claus Pedersen, Vallensbæk N. (DK)

(73) Assignee: Nokia Corporation, Espoo (FI)

( * ) Notice: Subject to any disclaimer, the term of this patent is extended or adjusted under 35 U.S.C. 154(b) by 1067 days.

(21) Appl. No.: 10/607,669

(22) Filed: Jun. 27, 2003

(65) Prior Publication Data

US 2004/0266454 A1 Dec. 30, 2004

(51) Int. Cl.
*H04M 3/00* (2006.01)
*H04Q 7/20* (2006.01)

(52) U.S. Cl. .............. 455/456.1; 455/412.2; 455/418; 455/456.3; 340/825.36; 340/825.49

(58) Field of Classification Search .............. 455/422.1, 455/426.1, 432.1, 432.3, 435.2, 456.1, 456.3, 455/456.6, 524–525, 550.1, 552.1, 414.1, 455/418, 419, 420, 412.2; 709/222–223; 340/825.36, 825.49
See application file for complete search history.

(56) References Cited

U.S. PATENT DOCUMENTS 6,389,288 B1* 5/2002 Kuwahara et al. ........ 455/456.6
2001/0024953 A1* 9/2001 Balogh ........................ 455/432
2002/0123373 A1* 9/2002 Kirbas et al. ................ 455/567
2002/0142788 A1* 10/2002 Chawla et al. .............. 455/504
2004/0198335 A1* 10/2004 Campen ..................... 455/419
2004/0235464 A1* 11/2004 Korkalo et al. ............. 455/418
2004/0249915 A1* 12/2004 Russell ....................... 709/223
2004/0266409 A1 12/2004 Nielsen et al. ........... 455/414.2

FOREIGN PATENT DOCUMENTS

GB 2342816 A 4/2000

OTHER PUBLICATIONS

"Open Mobile Alliance OMA-WAP-ProvCont-V1_1-20020920-d", Provising Content Specification V1.1, Draft Version 10, Sep. 2002, 77 pages.
Wireless Application Protocol WAP-235-Push OTA-20010425-a, Push OTA Protocol, Version 25, Apr. 2001, 44 pages.
"Open Mobile Alliance OMA-WAP-ProvCont-V1_1-20020920-d", Provisioning Content Specificiation V1.1, Draft Version 20-Sep. 2002, 77 pages.

* cited by examiner

*Primary Examiner*—Binh K Tieu
(74) *Attorney, Agent, or Firm*—Harrington & Smith PC

(57) ABSTRACT

A mobile cellular telephone for communicating in a cellular telecommunications network comprising: a memory for storing a plurality of different sets of parameter settings and a database for associating each set of parameter settings with a location; detection means for detecting the current location of the mobile telephone; and control means for interrogating the database to obtain the set of parameter settings associated with the current location and for controlling the mobile telephone in dependence upon the obtained set of parameter settings.

35 Claims, 1 Drawing Sheet

LOCATION DEPENDENT CONTROL OF A MOBILE CELLULAR TELEPHONE

TECHNICAL FIELD

The control of a mobile telephone using a set of location dependent parameter settings.

BACKGROUND TO THE INVENTION

FIG. 1 illustrates two contiguous cellular telecommunications networks 2a, 2b between which the user of a mobile cellular telephone 10 may roam. An area is divided into a number of cells 3. Each cell 3 has a base station 4 which communicates using radio signal with mobile cellular telephones 10 within its cell. The first and second networks 2a, 2b may be in the same or different countries.

Different networks support different communication capabilities and use different communication parameter settings. It is difficult and tiresome for a user to reconfigure their mobile cellular telephone and manually re-set parameter settings whenever the user roams from one network to another.

BRIEF SUMMARY OF THE INVENTION

According to one aspect of the invention there is provided a method of controlling a mobile cellular telephone comprising the steps of:
a) storing in the mobile telephone a plurality of different sets of parameter settings, each of which is associated with a location;
b) detecting at the mobile telephone the current location of the mobile telephone; and
c) controlling the mobile telephone using the set of parameter settings associated with the detected current location.

According to another aspect of the invention there is provided a mobile cellular telephone for communicating in a cellular telecommunications network comprising:
a memory for storing a plurality of different sets of parameter settings and a database for associating each set of parameter settings with a location;
detection means for detecting the current location of the mobile telephone; and
control means for interrogating the database to obtain the set of parameter settings associated with the current location and for controlling the mobile telephone in dependence upon the obtained set of parameter settings.

BRIEF DESCRIPTION OF THE DRAWINGS

For a better understanding of the present invention and to understand how the invention can be practised reference will now be made by way of example only to the accompanying drawings of embodiments of the invention in which.

DETAILED DESCRIPTION OF EMBODIMENTS(S) OF THE INVENTION

The Open Mobile Alliance (OMA) currently controls the Wireless Application Protocol (WAP). A number of specification documents have been published, which define how WAP should operate. These specifications include Provisioning Content Specification V1.1 (Draft Version 20 Sep. 2002) and WAÅ-(WAP)189-PushOTA.

A wireless application protocol (WAP) network comprises a number of clients, servers and proxy gateways that mediate between a client and server.

WAP supports "pull" and "push" technology. In "pull" technology, a client requests a service or information from a server, which then responds by transmitting information to the client. Browsing the World Wide Web is a typical example of pull technology. In "push" technology, the server sends information to the client without an explicit request i.e. it is server initiated.

Provisioning is a process by which a WAP client is configured to perform a service with a minimum of user interaction on receipt of a provisioning document. A provisioning document generally contains a plurality of configuration parameter settings. These settings may be necessary to allow the proper functioning of the phone and, in particular, the communication of the phone with a cellular telecommunications network. For example, the settings may relate to the applications usable by the phone, the browser settings, network access point settings, proxy server settings and application protocol settings.

An OMA provisioning document is a binary encoded XML document with a special MIME type that is interpreted at the application level of a mobile telephone. The XML Document Type Definition (DTD) for a provisioning document defines two elements: a parm element, which is used to provide values for the individual parameters; and a characteristic element, which is used to group parameters into logical entities.

Figure 1:
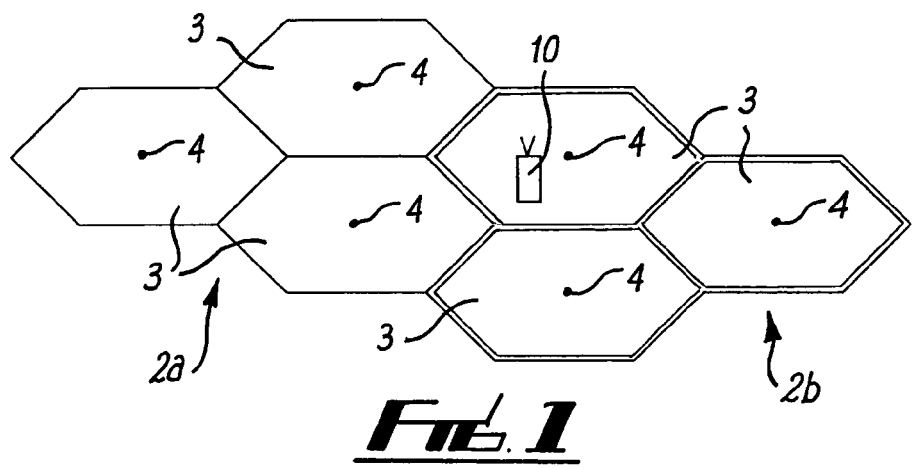
FIG. 1 illustrates two contiguous cellular telecommunications networks 2a, 2b.
Figure 2:
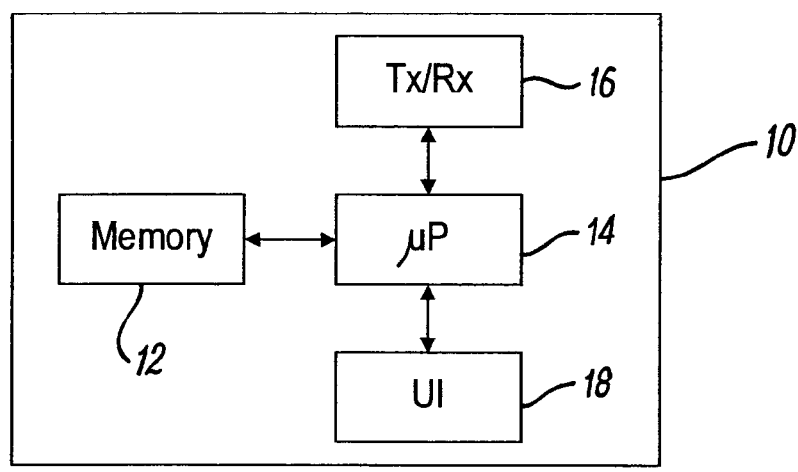
FIG. 2 schematically illustrates a mobile telephone.

FIG. 2 schematically illustrates a mobile telephone 10. The phone 10 comprises a memory 12, a processor 14 a radio transceiver 16 and a user interface 18. A mobile telephone will have additional components, but a minimum of the components have been illustrated to improve clarity. The processor 14 is operable to read from and write to the memory 12 which stores a database 30. The radio transceiver 16 is operable to communicate with a base station of a local cell. The processor 14 is also operable to receive data from the cellular telecommunications network 2 via its radio transceiver 16.

Figure 3:
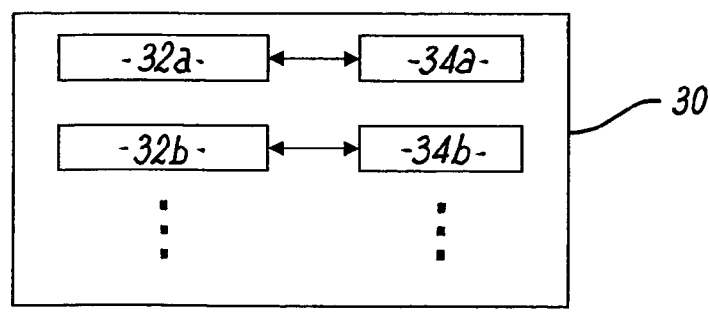
FIG. 3 schematically illustrates a database.

The database 30, as schematically illustrated in FIG. 3, stores a plurality of provisioning documents 32, each of which provides the settings required for the phone to operate in different cellular telecommunications networks. For example, there may be a first provisioning document 32a that provides the settings for the Sonera network in Finland and there may be a second provisioning document 32b that provides the network settings for the Vodafone network in the UK. Each of the provisioning documents 32 is associated in the database with a network identifier 34. For example, a first network identifier 34a is associated with the first provisioning document 32a and identifies the Sonera network in Finland and the second network identifier 34b is associated with the second provisioning document 32b and identifies the Vodafone network in the UK.

The network identifiers 34, may for a GSM enabled telephone, be Base Station Identifier Codes (BSIC) which are also known as color codes. The color code includes a Network Color Code (NCC) portion that includes a country code portion. The Network Color Code can be used to identify a network.

In GSM, the BSIC is regularly broadcast on the Synchronisation Channel (SCH) by the base stations 4 of every network cell. Every mobile telephone listens to the SCH in idle mode and when it is first switched on. The mobile cellular telephone 10 therefore 'knows' the BSIC of the cell in which it is operational.

Consequently, when the phone is switched on the BSIC of the local cell is acquired. The Network Color Code is determined from the BSIC. The database 30 is interrogated using the Network Color code 34 and it returns the provisioning document associated with that NCC. The mobile phone 10 is then provisioned using this provisioning document 32. The mobile terminal thus automatically acquires the settings necessary for it to operate correctly within the local cell.

When the mobile phone moves to a new local cell in a different network, the BSIC of the new local cell is acquired. The Network Color Code is determined from the BSIC. The database 30 is interrogated using the Network Color code 34 and it returns the provisioning document 32 associated with that NCC. The mobile phone 10 is then provisioned using this provisioning document 32. The mobile terminal thus automatically acquires the settings necessary for it to operate correctly within the new local cell.

An entry may be made in the database 30 the first time the mobile telephone 10 enters a new network 2. The network downloads a bootstrap provisioning document 32 to the phone 10 which is stored in the database 30 in association with the current cells NCC 34.

The mobile telephone allows the user to choose, using the user interface 18, whether or nor the configuration parameter settings should be automatically updated without any user interaction or whether the user should be prompted to manually accept the update via the user interface 18.

The database 30 may additionally define 'protected' configuration parameter settings. These are particular settings that should not be allowed to be altered by the above described updating process. The mobile telephone 10 may provide an option that the user can select via the user interface 18 for designating certain settings as protected. Thus a user can protect the settings for certain applications, such as corporate email settings from updating.

Although the above described updating occurs on a network basis, it is possible for the updating to occur on a different basis. For example, different parts of the same network could use different settings. The identifier 34 associated with a provisioning document 32 may therefore indicate a cell or other area. It may even indicate a GPS location reference, in which case the mobile telephone 10 would have a GPS receiver and would interrogate the database with GPS location.

Although the invention has been described with reference to the configuration of communication and application settings for the mobile telephone 10, it may be extended to the configuration of different personal settings depending on location. These personal settings may include the alert settings of the mobile telephone, the list of bookmarks used by the browser application, the arrangement of contact telephone numbers in the phonebook, the wall paper or screen saver settings used. Separate personal provisioning documents 32 may be stored in the database 30 and associated with location identifiers 34 such as NCC or GPS references. For example, the telephone configuration can be changed to settings for 'home use' when the user returns to a cell local to his home. The home cell may be identified by its Cell ID or by GPS reference. The telephone configuration can be changed to settings for 'office use' when the user returns to the cell local to his office. The office cell may be identified by its Cell ID or by GPS reference.

The above described processes may be performed by the processor under the control of a computer program that includes executable instructions. The computer program may be stored on a data storage medium or downloaded over the air. It may be used to upgrade an existing mobile telephone so that it can perform the above described method Although embodiments of the present invention have been described in the preceding paragraphs with reference to various examples, it should be appreciated that modifications to the examples given can be made without departing from the scope of the invention as claimed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method comprising:
 a) storing in a mobile telephone a plurality of different sets of parameter settings, each of which is associated with a location;
 b) detecting at the mobile telephone the current location of the mobile telephone;
 c) controlling the mobile telephone using the set of parameter settings associated with the detected current location; and
 d) downloading a set of parameter settings to the mobile telephone when the mobile telephone enters a new location;
 where during performance of a parameter setting update process at least one parameter is updated and at least one parameter setting is a user specified protected parameter setting that is not allowed to be changed.

2. A method as claimed in claim 1, wherein the different sets of parameter settings comprise settings for controlling how the mobile telephone communicates in a cellular telecommunications network.

3. A method as claimed in claim 2, wherein the different sets of parameter settings comprise settings for one or more of: a network access point, a proxy server, and an application protocol.

4. A method as claimed in claim 1, wherein at least one of the sets of parameter settings comprises application settings.

5. A method as claimed in claim 4, wherein the application settings comprise settings for an email client.

6. A method as claimed in claim 1, wherein each set of parameter settings is contained within a provisioning document.

7. A method as claimed in claim 1 wherein the mobile telephone detects its current location from information broadcast by a local base station of a cellular telecommunications network.

8. A method as claimed in claim 7, wherein the information broadcast is a network color code or a cell identification.

9. A method as claimed in claim 1, wherein the mobile telephone is automatically controlled using the set of parameter settings associated with a first location when the mobile telephone is located at the first location.

10. An apparatus comprising:
 a memory configured to store a plurality of different sets of parameter settings and a database for associating each set of parameter settings with a location;
 a detector configured to detect the current location of the apparatus;
 a controller configured to interrogate the database to obtain a set of parameter settings associated with the current location and to control the apparatus in dependence upon the obtained set of parameter settings; and an interface configured to receive a set of parameter settings when the apparatus enters a new location;

where during performance of a parameter setting update process at least one parameter is updated and at least one parameter setting is a user specified protected parameter setting that is not allowed to be altered.

11. An apparatus as claimed in claim 10, wherein the different sets of parameter settings comprise settings for controlling how the apparatus communicates in a cellular telecommunications network.

12. An apparatus as claimed in claim 11, wherein the different sets of parameter settings comprise settings for one or more of: a network access point, a proxy server, and an application protocol.

13. An apparatus as claimed in claim 10, wherein at least one of the sets of parameter settings comprises application settings.

14. An apparatus as claimed in claim 13, wherein the application settings comprise settings for an email client.

15. An apparatus as claimed in claim 10, wherein each set of parameters is contained within a provisioning document.

16. An apparatus as claimed in claim 10, wherein the apparatus detects its current location from information broadcast by a local base station of a cellular telecommunications network.

17. An apparatus as claimed in claim 16, wherein the information broadcast is a network color code or a cell identification.

18. An apparatus as claimed in claim 10, wherein the controller is further configured to automatically control the apparatus using a set of parameter settings associated with a first location when the apparatus is located at the first location.

19. An apparatus comprising:

means for storing a plurality of different sets of parameter settings and a database for associating each set of parameter settings with a location;

means for detecting the current location of the apparatus;

means for interrogating the database to obtain the set of parameter settings associated with the current location and for controlling the apparatus in dependence upon the obtained set of parameter settings; and means for downloading a set of parameter settings to the apparatus when the apparatus enters a new location;

where during performance of a parameter setting update process at least one parameter is updated and at least one parameter setting is a user specified protected parameter setting, and further comprising means for preventing the at least one user specified protected parameter setting from being altered.

20. An apparatus as claimed in claim 19, wherein the different sets of parameter settings comprise settings for controlling how the apparatus communicates in a cellular telecommunications network.

21. An apparatus as claimed in claim 19, wherein the apparatus is configured to detect its current location from information broadcast by a local base station of a cellular telecommunications network.

22. An apparatus as claimed in claim 19, wherein the means for controlling automatically controls the apparatus using a set of parameter settings associated with a first location when the apparatus is located at the first location.

23. A computer readable medium encoded with a computer program comprising:

a) computer code for storing in a mobile communication device a plurality of different sets of parameter settings, each of which is associated with a location;

b) computer code for detecting at the mobile communication device the current location of the mobile communication device;

c) computer code for controlling the mobile communication device using the set of parameter settings associated with the detected current location; and d) computer code for downloading a set of parameter settings to the mobile communication device when the mobile communication device enters a new location;

where during performance of a parameter setting update process at least one parameter is updated and at least one parameter setting is a user specified protected parameter setting, and further comprising computer code to prevent the at least one user specified protected parameter setting from being altered.

24. A computer readable medium as claimed in claim 23, wherein the different sets of parameter settings comprise settings for controlling how the mobile communication device communicates in a cellular telecommunications network.

25. A computer readable medium as claimed in claim 23, wherein at least one of the sets of parameter settings comprises application settings.

26. A computer readable medium as claimed in claim 25, wherein the application settings comprise settings for an email client.

27. A computer readable medium as claimed in claim 23, wherein each set of parameter settings are contained within a provisioning document.

28. A computer readable medium as claimed in claim 23, wherein the mobile communication device detects its current location from information broadcast by a local base station of the cellular telecommunications network.

29. A computer readable medium as claimed in claim 23, wherein the mobile communication device is automatically controlled using the set of parameter settings associated with a first location when the mobile communication device is located at the first location.

30. A method as claimed in claim 1, where the user-specified protected parameter setting is associated with a certain application.

31. A method as claimed in claim 1, further comprising e) allowing a user to choose via a user interface between automatic updating of parameter settings and prompting the user to manually accept updating of parameter settings.

32. A method as claimed in claim 4, wherein the application settings comprise settings for an internet browser.

33. An apparatus as claimed in claim 13, wherein the application settings comprise settings for an internet browser.

34. An apparatus as claimed in claim 19, wherein at least one of the sets of parameter settings comprise application settings, and wherein the application settings comprise settings for at least one of an email client and an internet browser.

35. A computer readable medium as claimed in claim 25, wherein the application settings comprise settings for an internet browser.

* * * * *